No. 804,209. PATENTED NOV. 14, 1905.
O. T. BURTNESS.
ILLUMINATED BAR.
APPLICATION FILED JUNE 12, 1905.
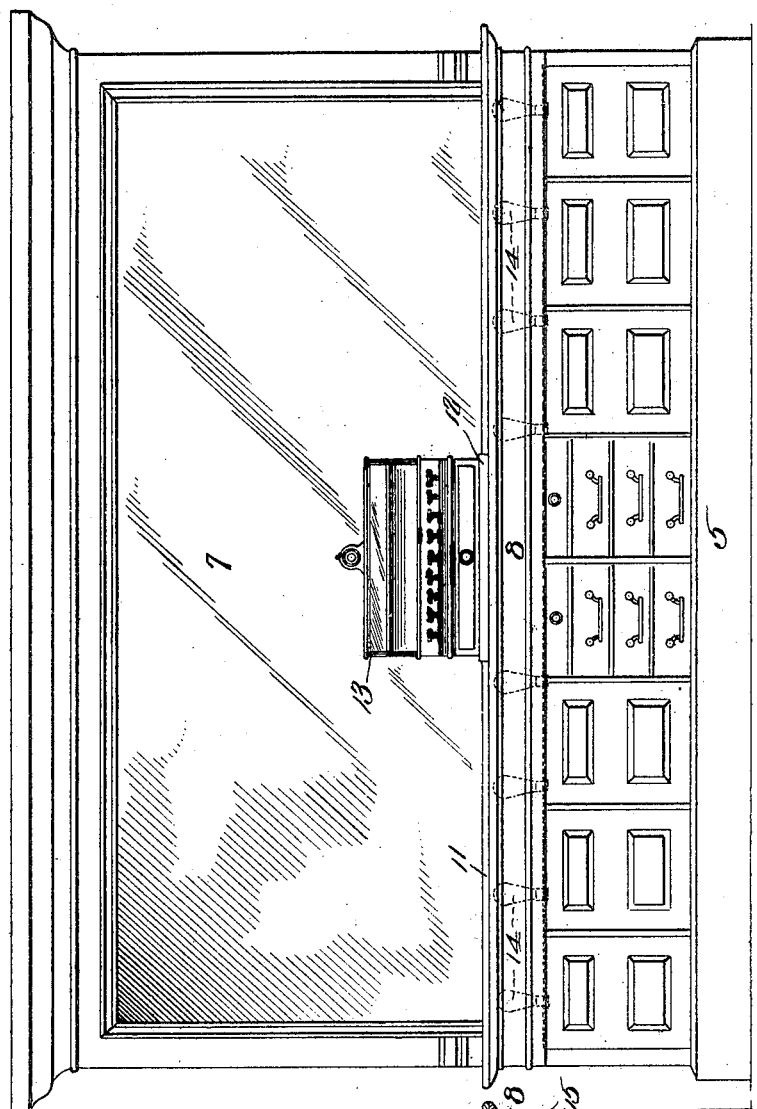
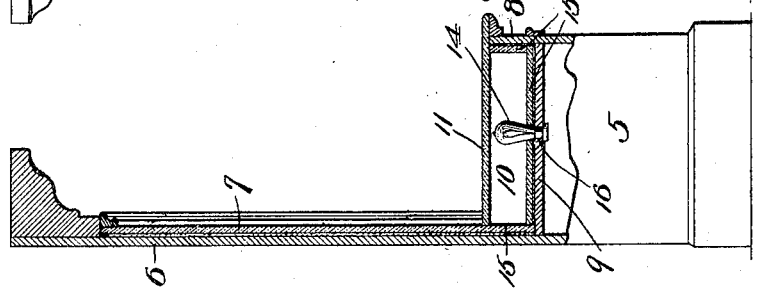
Witnesses
Olaf T. Burtness, Inventor.
by C. A. Snow & Co.
Attorneys

UNITED STATES PATENT OFFICE.

OLAF T. BURTNESS, OF SIOUX CITY, IOWA.

ILLUMINATED BAR.

No. 804,209.　　　Specification of Letters Patent.　　　Patented Nov. 14, 1905.

Application filed June 12, 1905. Serial No. 264,908.

*To all whom it may concern:*

Be it known that I, OLAF T. BURTNESS, a citizen of the United States, residing at Sioux City, in the county of Woodbury and State of Iowa, have invented a new and useful Illuminated Bar, of which the following is a specification.

This invention relates to back bars for saloons, buffets, and the like, and more particularly to means for illuminating the top of the bar, whereby the glasses, bottles, dishes, and other articles used in connection with the bar may be effectually displayed.

The object of the invention is to provide a bar having a longitudinal compartment the top of which is covered by a transparent or translucent glass plate, which constitutes the top of the bar and upon which the bottles and similar articles are supported, said compartment being illuminated and having its interior walls provided with reflecting-surfaces, whereby the light will be directed upwardly and thoroughly illuminate the articles upon the bar.

With these and other objects in view the invention consists in the construction and novel combination and arrangement of parts hereinafter fully described, illustrated in the accompanying drawings, and pointed out in the claim hereto appended, it being understood that various changes in form, proportion, and minor details of construction may be resorted to without departing from the principle or sacrificing any of the advantages of this invention.

In the accompanying drawings, forming a part of this specification, Figure 1 is a front elevation of a back bar provided with an illuminated top constructed in accordance with my invention. Fig. 2 is a transverse sectional view of the same.

Similar numerals of reference indicate corresponding parts in all the figures of the drawings.

In the accompanying drawings, 5 designates the back bar, provided with a vertical extension 6, upon which is mounted a mirror 7, these parts being of the usual form and construction and forming no part of the present invention. The front 8 of the bar is extended above the horizontal partition 9 to form a compartment 10, the top of which is covered by a transparent or translucent glass plate 11, which forms the top of the bar and upon which the glasses, bottles, and other articles used in connection with the bar are supported. The glass plate 11 is preferably formed in two sections, the adjacent ends of which are spaced apart by a slab of marble, wood, or similar material 12, so as to form a firm support for a cash-register 13. Arranged within the compartment 10 and connected in any suitable manner to a suitable source of electrical energy are a series of spaced incandescent lights 14, and surrounding the interior walls of said compartment are reflecting-surfaces 15 for directing the rays of light upwardly through the glass plate 11, so as to illuminate the bottles and other articles supported on the latter.

The lower edge of the mirror 7 is preferably extended within the compartment 10 to form the rear reflecting-surface of the compartment; but, if desired, said mirror may terminate flush with the plate 11 and a separate reflecting-surface used instead. In the present instance I have shown incandescent bulbs for illuminating the compartment 10, said bulbs being seated in suitable sockets 16, formed in the horizontal partition 9; but said bulbs may be introduced into the compartment and supported directly on the lower reflecting-surface of the latter, or, if desired, suitable lamps, gas-burners, or other lighting medium may be employed for illuminating said compartments.

A back bar constructed in the manner described will effectually display and illuminate all articles placed upon the same and give the saloon an attractive and artistic appearance, while the lights being arranged in a separate compartment beneath the top of the bar danger of breaking the same in removing and replacing the bottles when serving customers is effectually prevented.

Having thus described the invention, what is claimed is—

An illuminated bar having an opaque front and provided with a vertical extension, a partition extending transversely of the bar, a mirror mounted on the extension and having its lower edge resting on said partition, a glass top supported by the front of the bar and spaced from the partition to form a compartment, a reflector disposed within the compartment, and means for illuminating the latter.

In testimony that I claim the foregoing as my own I have hereto affixed my signature in the presence of two witnesses.

OLAF T. BURTNESS.

Witnesses:
 JOHN W. CAMPBELL,
 C. N. LUKES.